US009164825B2

(12) United States Patent
Morimoto

(10) Patent No.: US 9,164,825 B2
(45) Date of Patent: Oct. 20, 2015

(54) COMPUTING UNIT, METHOD OF MANAGING COMPUTING UNIT, AND COMPUTING UNIT MANAGEMENT PROGRAM

(75) Inventor: Naoki Morimoto, Aichi (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 406 days.

(21) Appl. No.: 13/512,604

(22) PCT Filed: Jan. 4, 2011

(86) PCT No.: PCT/JP2011/050005
§ 371 (c)(1),
(2), (4) Date: May 30, 2012

(87) PCT Pub. No.: WO2011/083778
PCT Pub. Date: Jul. 14, 2011

(65) Prior Publication Data
US 2012/0239988 A1 Sep. 20, 2012

(30) Foreign Application Priority Data
Jan. 6, 2010 (JP) .................................. 2010-001376

(51) Int. Cl.
*G06F 11/00* (2006.01)
*G06F 11/07* (2006.01)
(Continued)

(52) U.S. Cl.
CPC ........ *G06F 11/0766* (2013.01); *G06F 11/0715* (2013.01); *G06F 11/0724* (2013.01); *G06F 11/1482* (2013.01); *G06F 11/2035* (2013.01); *G06F 11/2038* (2013.01)

(58) Field of Classification Search
CPC ............ H04Q 1/00; H04Q 2213/13093; H04I 41/046; H04I 41/0659
USPC .................. 714/4.3, 38.1; 709/201
See application file for complete search history.

(56) References Cited

U.S. PATENT DOCUMENTS 5,787,249 A * 7/1998 Badovinatz et al. .......... 709/201
5,790,772 A * 8/1998 Badovinatz et al. .......... 714/4.1
(Continued)

FOREIGN PATENT DOCUMENTS

JP 5-342058 12/1993
JP 2000-215076 8/2000
(Continued)

OTHER PUBLICATIONS

Seshadri, "A Fault-Tolerant Middleware Architecture for High-Availability Storage Services" Feb. 2007, Georgia Institute of Technology, p. 1-8.*
(Continued)

*Primary Examiner* — Bryce Bonzo
*Assistant Examiner* — Jeison C Arcos
(74) *Attorney, Agent, or Firm* — Wenderoth, Lind & Ponack, L.L.P.

(57) ABSTRACT

A computing unit includes an operating system that is connected with another computing unit via an information transmitting medium in a mutually communicable manner, wherein availability management middleware is interposed between a software component and the operating system and launches the software component as a child process, thus serving as a parent process of the software component. The operating system monitors a running status of the software component and reports abnormality information for the software component to the availability management middleware in the case in which an abnormality is detected in the software component. Upon acquiring the abnormality information, the availability management middleware reports the abnormality information for the software component to the other computing unit.

3 Claims, 6 Drawing Sheets

(51) Int. Cl.
*G06F 11/14* (2006.01)
*G06F 11/20* (2006.01)

(56) References Cited

U.S. PATENT DOCUMENTS

| | | | | |
|---|---|---|---|---|
| 5,996,087 | A * | 11/1999 | Badovinatz et al. | 714/4.1 |
| 6,763,369 | B1 * | 7/2004 | Ytuarte et al. | 709/201 |
| 6,854,072 | B1 * | 2/2005 | Cagle et al. | 714/15 |
| 2006/0005204 | A1 * | 1/2006 | Siegel et al. | 719/313 |
| 2006/0085664 | A1 * | 4/2006 | Nakamura et al. | 714/1 |
| 2008/0215743 | A1 * | 9/2008 | Wahl | 709/230 |
| 2009/0106748 | A1 * | 4/2009 | Chess et al. | 717/168 |

FOREIGN PATENT DOCUMENTS

| | | |
|---|---|---|
| JP | 2005-209191 | 8/2005 |
| JP | 2007-133603 | 5/2007 |
| JP | 2008-15950 | 1/2008 |
| JP | 2008-188416 | 8/2008 |
| JP | 2009-301079 | 12/2009 |

OTHER PUBLICATIONS

Microsoft "Computer Dictionary 5th Edition", 2002, Microsfot Press, p. 340.*
"What is Middleware" Sep. 2007, middleware.org, p. 1-2.*
"The Origin (Coining) of the Term Middleware", Nov. 2003, http://ironick.typepad.com, p. 1-2.*
International Search Report issued Feb. 8, 2011 in corresponding International Application No. PCT/JP2011/050005.
Written Opinion of the International Searching Authority issued Feb. 8, 2011 in corresponding International Application No. PCT/JP2011/050005.
Toshio Shirakihara et al., "New Technology for High-Availability-Middleware for Developing Fault-Tolerant Distributed System", Toshiba Review, Aug. 1, 1997, vol. 52, No. 8, pp. 40-42.
Japanese Office Action issued Feb. 3, 2015, in Japanese Application No. 2010-1376 (with English translation).

* cited by examiner

COMPUTING UNIT, METHOD OF MANAGING COMPUTING UNIT, AND COMPUTING UNIT MANAGEMENT PROGRAM

TECHNICAL FIELD

The present invention relates to, for example, availability of computing systems.

BACKGROUND OF INVENTION

Background Art

Conventionally, availability management middleware that manages software components running in a computing unit is interposed between an operating system and software components and obtains dead/alive information for the software components by periodically querying the operating system about the results of dead/alive monitoring of the software components, which are ascertained by the operating system. In addition, in a computing system provided with a plurality of computing units, efforts have been made to improve the availability of the computing system by having the availability management middleware of the individual computing units exchange the dead/alive information obtained from the operating systems with other computing units and ascertain the dead/alive information for the software components among the individual computing units.

As a method of increasing the availability of a computing system, Patent Literature 1 discloses a technique in which loads on individual computing units are monitored for each computing unit, and, when the loads increase, the loads are dispersed by having other computing units execute the processing, thereby improving the availability of the computing system.

CITATION LIST

Patent Literature

{PTL 1} Japanese Unexamined Patent Application, Publication No. 2008-15950

SUMMARY OF INVENTION

However, there is a problem with the above-described conventional method in that, because the availability management middleware queries the operating systems about the dead/alive information in accordance with the number of software components, the processing load exerted on the availability management middleware related to inquiring about the dead/alive information increases when a large number of software components are involved. There is an additional problem with the above-described conventional method in that all dead/alive information for the software components obtained from the operating systems is reported to other computing units, and thus, a large load is exerted on the information transmission medium which connects the individual computing units in the computing system.

The present invention has been conceived to solve the above-described problems, and an object thereof is to provide a computing unit and a computing system that are capable of reducing the processing load related to monitoring faults in software components.

The present invention employs the following solutions in order to solve the above-described problems.

A first aspect of the present invention provides a computing unit that is provided with an operating system and that is connected with another computing unit via an information transmission medium in a mutually communicable manner, including middleware that is interposed between a software component and the operating system and that launches the software component as a child process, thus serving as a parent process for the software component; wherein the operating system monitors a running status of the software component and reports abnormality information to the middleware in the case in which an abnormality is detected in the software component; and, upon acquiring the abnormality information, the middleware reports the abnormality information for the software component to the other computing unit.

With such a configuration, once the middleware launches the software component, which is the child process, by serving as the parent process of the software component, the operating system monitors the child process (software component) and, in the case in which there is an abnormality in the running status of the child process (software component), the operating system reports the abnormality information to the parent process (middleware). In addition, the middleware reports the abnormality information to the other computing unit.

In this way, the operating system monitors the running status of the software component and reports the abnormality information to the middleware in the case in which an abnormality is detected in the software component. By doing so, as compared with the case in which the middleware periodically queries the operating system about the presence/absence of an abnormality in the software component, as has conventionally been done, it is possible to reduce the processing load on the middleware required for monitoring the software component. In addition, in the case in which the abnormality information is acquired, because the middleware, reports this to the other computing unit, as compared with the case in which the information about the presence/absence of an abnormality is periodically exchanged with the other computing unit, it is possible to reduce the load exerted on the information transmission medium.

A second aspect of the present invention provides a computing unit that is provided with an operating system and that is connected with another computing unit via an information transmission medium in a mutually communicable manner, including an intermediary component that launches a software component as a child process, thus serving as a parent process for the software component; that is interposed between the software component and the operating system; and that outputs abnormality information for the software component to middleware that manages availability of the software component; wherein the operating system monitors a running status of the software component and reports the abnormality information to the intermediary component in the case in which an abnormality is detected in the software component; and, upon acquiring the abnormality information via the intermediary component, the middleware reports the abnormality information for the software component to the other computing unit.

With such a configuration, once the intermediary component launches the software component, which is the child process, by serving as the parent process of the software component, the operating system monitors the child process (software component) and, in the case in which there is an abnormality in the running status of the child process (software component), the operating system reports the abnormality information to the middleware via the parent process (intermediary component). In addition, the middleware reports the abnormality information to the other computing unit.

In this way, the operating system monitors the running status of the software component and reports the abnormality information to the middleware via the intermediary component in the case in which an abnormality is detected in the software component. By doing so, as compared with the case in which the middleware periodically queries the operating system about the presence/absence of an abnormality in the software component, as has conventionally been done, it is possible to reduce the processing load on the middleware required for monitoring the software component. In addition, even in the case in which, for example, it is difficult to alter programs, etc. in order to cause the middleware to serve as the parent process for the software component, because the acquired abnormality information for the software component is reported to the middleware by making the intermediary component serve as the parent process, the middleware can easily acquire the abnormality information. Furthermore, in the case in which the abnormality information is acquired, because the middleware reports this to the other computing unit, as compared with the case in which the information about the presence/absence of an abnormality is periodically exchanged with the other computing unit, it is possible to reduce the load exerted on the information transmission medium.

The running status of the computing unit may be reported to the other computing unit as computing-unit dead/alive information by using a function of the middleware.

Because the middleware reports the computing-unit dead/alive information to the other computing unit independent of the abnormality information for the software component, it is possible to reduce the processing load exerted on the individual middleware.

A third aspect of the present invention provides a computing system provided with a plurality of any one of the computing units described above, wherein, in the case in which one of the computing units runs the software component in an active mode, at least one of the other computing units runs the software component that is the same as that software component in a standby mode; and in the event of a fault occurring in at least one of the software components that are run in the active mode or the standby mode, the middleware reports the abnormality information to the other computing units in which the same software components are run.

Because the computing unit having the same software component as the software component in which a fault has occurred is set to be a computing unit to which the abnormality information is reported, it is possible to reduce the amount of information carried by the information transmission medium regardless of the number of computing units provided in the system. In addition, the processing load exerted on the middleware of the computing unit having the software component that is different from the software component in which the fault has occurred is reduced.

One of the computing units in the computing system described above may run the software component in the active mode; and the plurality of other computing units may run, in the standby mode, the software components that are the same as the software component run in the active mode in the one computing unit.

Because the plurality of computing units in which it is run in the standby mode are provided, even when a fault has occurred in the computing unit in which it is run in the active mode and while the software component run in the standby mode in one computing unit is being switched to the active mode, the software component for which the fault has occurred can be run in the standby mode in other computing units. In this way, by providing the plurality of software components in the standby mode, redundancy can be ensured.

With the computing system described above, when a fault occurs in the software component running in the active mode and after the software component that is running, in the standby mode, the software component for which the fault has occurred is switched to the active mode from the standby mode, it is preferable that a computing unit that is in a segment physically or virtually distant from a computing unit in which the software component for which the fault has occurred has been run in the active mode be selected as a computing unit that newly launches, in the standby, mode the software component for which the fault has occurred.

In this way, because the computing unit in which the software component is run in the active mode and the computing unit in which the software component is run in the standby mode are disposed in segments that are physically or virtually distant, even in the case in which a comparatively large scale fault, such as physical destruction at a segment level, etc., has occurred, recovery from the fault is possible with the computing unit in which the software component is run in the standby mode.

A fourth aspect of the present invention provides a computing unit management method for a computing unit that is connected with another computing unit via an information transmission medium in a mutually communicable manner, the method including a stage of launching a software component as a child process by using middleware interposed between the software component and the operating system, thus making the middleware serve as a parent process for the software component; a stage of monitoring a running status of the software component by using the operating system and reporting abnormality information to the middleware in the case in which an abnormality is detected in the software component; and a stage of reporting, once the abnormality information is acquired, the abnormality information for the software component to the other computing unit by using the middleware.

A fifth aspect of the present invention provides a computing unit management program to be executed by a computer included in a computing unit that is connected to another computing unit via an information transmission medium in a mutually communicable manner, the program causing the computer to execute processing in which middleware interposed between a software component and an operating system launches the software component as a child process, thus serving as a parent process for the software component; and processing in which, upon acquiring the abnormality information for the software component reported by the operating system, the middleware reports the abnormality information for the software component to the other computing unit.

A sixth aspect of the present invention provides a computing unit management method for a computing unit that is connected with another computing unit via an information transmission medium in a mutually communicable manner, the method including a stage of launching a software component as a child process by using an intermediary component that is interposed between the software component and an operating system and that outputs abnormality information for the software component to middleware that manages the availability of the software component, thus making the intermediary component serve as a parent process for the software component; a stage of monitoring a running status of the software component by using the operating system and reporting the abnormality information to the intermediary component in the case in which an abnormality is detected in the software component; and a stage of reporting, once the abnormality information is acquired via the intermediary component, the abnormality information for the software component to the other computing unit by using the middleware.

A seventh aspect of the present invention provides a computing unit management program to be executed by a computer included in a computing unit that is connected to another computing unit via an information transmission medium in a mutually communicable manner, the program causing the computer to execute processing in which an intermediary component interposed between a software component and an operating system launches the software component as a child process, thus serving as a parent process for the software component; and processing in which the intermediary component manages the availability of the software component by being interposed between the software component and the operating system and also outputs abnormality information for the software component to middleware that reports the abnormality information for the software component to the other computing unit.

The present invention affords an advantage in that it is possible to reduce the processing load related to monitoring faults in software components.

DETAILED DESCRIPTION OF INVENTION

Embodiments of a computing unit and a computing system according to the present invention will be described with reference to the drawings.
{First Embodiment}
A first embodiment of the present invention will be described below by using FIG. 1.

Figure 1:
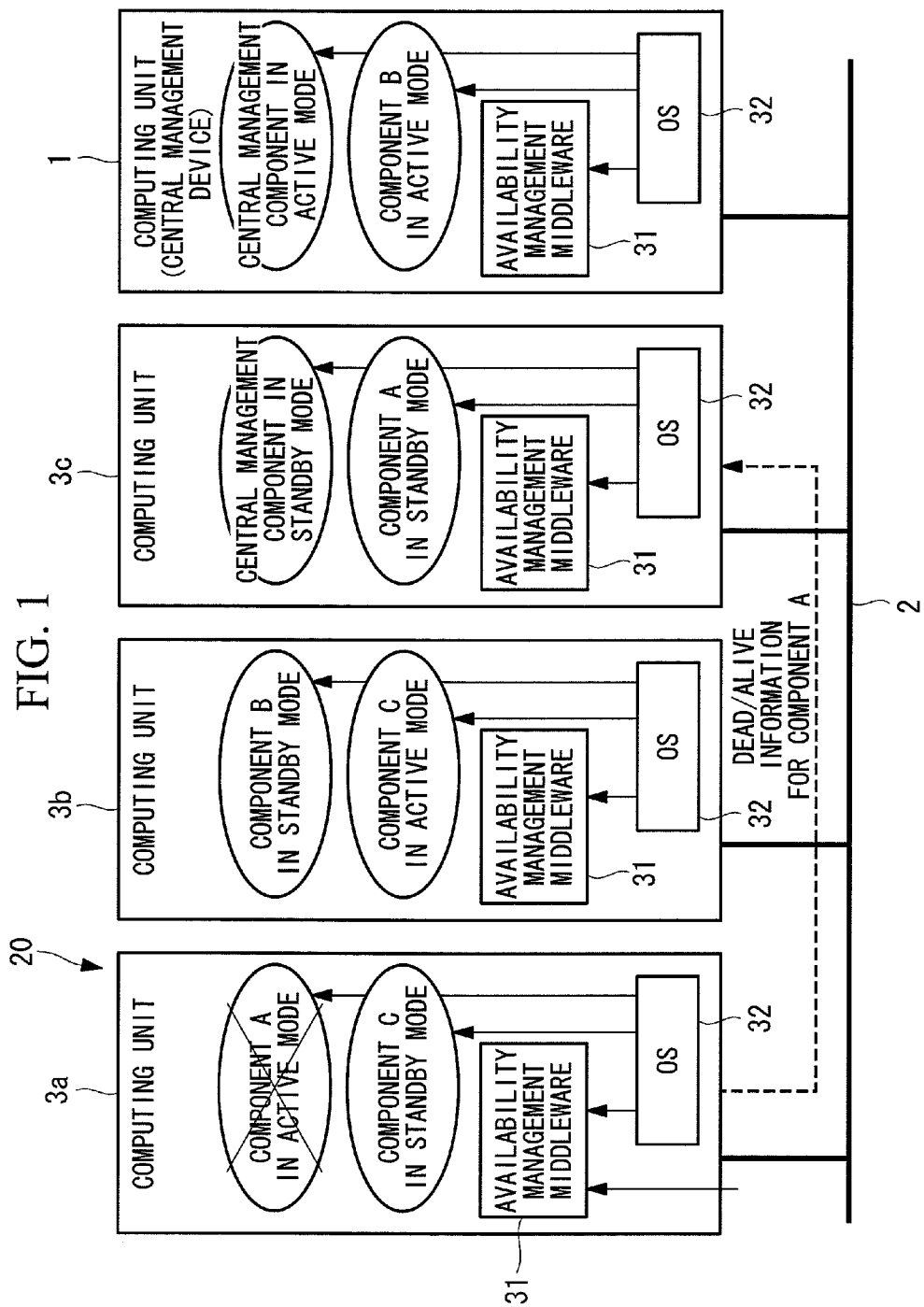
FIG. 1 is a diagram showing the configuration of the main functions of a computing system according to a first embodiment of the present invention.

As shown in FIG. 1, a computing system 20 according to this embodiment is provided with a plurality of computing units 3a, 3b, and 3c and a central management device 1. The individual computing units 3a, 3b, and 3c and the central management device 1 are connected with each other via an information transmission medium 2 in a configuration that allows bidirectional communication. In the following, the computing units will be described as computing units 3 unless an explicit description is specifically given. Although an example in which three computing units 3 are provided will be described, the number of computing units provided in the computing system 20 is not limited thereto.

Figure 2:
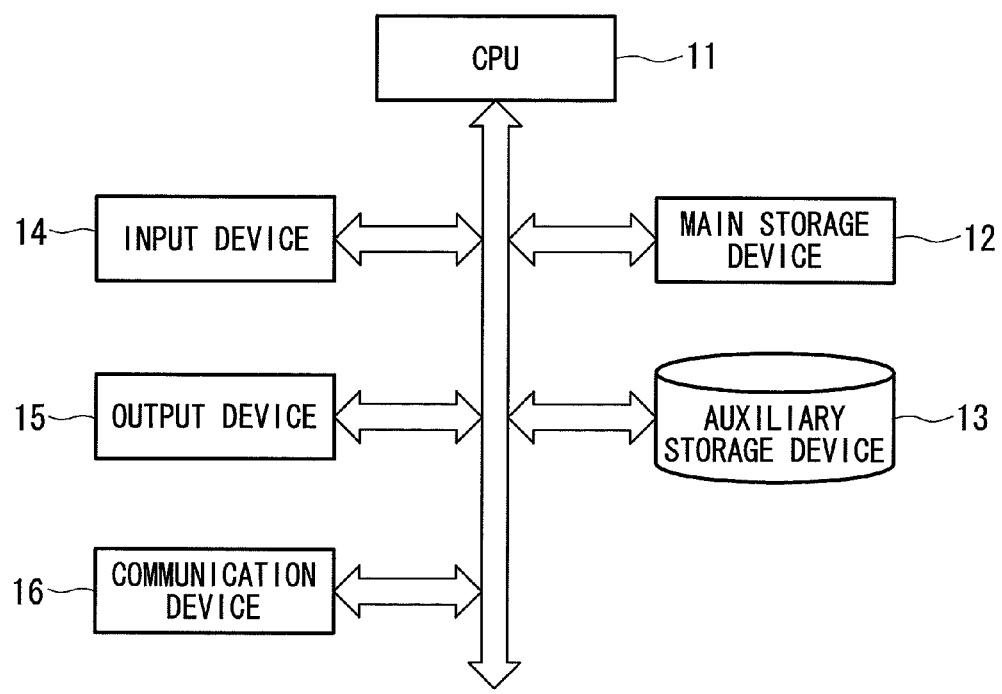
FIG. 2 is a diagram showing, in outline, the configuration of a computing unit according to the first embodiment.

FIG. 2 is a block diagram showing, in outline, the configuration of the computing units 3 in the computing system 20 according to this embodiment. As shown in FIG. 2, the computing units 3 according to this embodiment are so-called computer systems formed of CPUs (central processing units) 11, main storage devices 12, such as RAM (Random Access Memory) or the like, auxiliary storage devices 13, input devices 14 such as keyboards, mice, etc., output devices 15, such as displays, printers, etc., and communication devices 16 that exchange information by communicating with external equipment. The auxiliary storage devices 13 are computer-readable storage media, examples of which include magnetic disks, magneto-optical disks, CD-ROMs, DVD-ROMs, semiconductor memories, and so forth.

Figure 3:
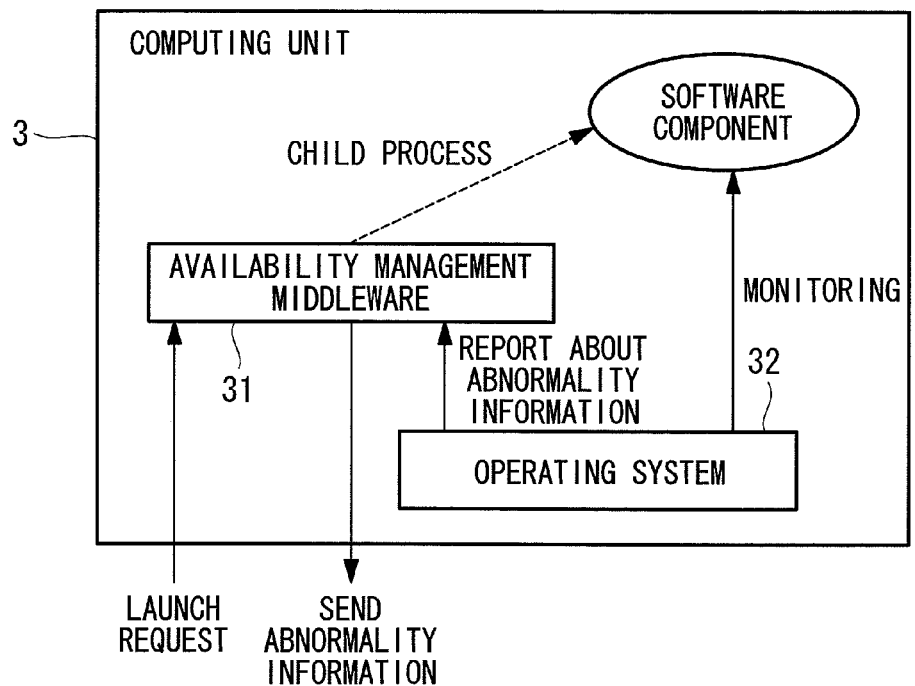
FIG. 3 is a diagram showing the configuration of the main functions of the computing unit according to the first embodiment.

FIG. 3 is a diagram showing the configuration of main functions of the computing units 3 of the present invention. As shown in FIG. 3, the computing units 3 are provided with availability management middlewares (middlewares) 31, operating systems (OS) 32, and software components A, B, C, and D.

Next, specifics of processing executed at individual portions provided in the computing units 3 will be described with reference to FIG. 1.

With the computing units 3, when one of the computing units 3 is running a software component in an active mode, at least one of the other computing units 3 is running a software component that is the same as that software component in a standby mode.

For example, the computing unit 3a is running the software component A in the active mode and the computing unit 3c is running the software component A in the standby mode. The active mode is a mode in which a software component is running. In contrast, the standby mode is a preparatory mode in which a component normally stands by as an auxiliary component and is quickly switched to the active mode to continue the operation in the case in which a component in the active mode becomes unusable or is stopped.

The computing unit that is running a software component in the active mode regularly reports information possessed by the software component running in the active mode to a computing unit that is running the same software component in the standby mode, thus causing the software component running in the active mode and the software component running in the standby mode to possess information that is shared between them. In this way, redundancy is ensured by installing the same software components in the plurality of computing units and by making them run in the active mode and the standby mode, thus making it possible to quickly switch to a computing unit that runs it in the active mode. In the following, the software component in the active mode and the software component in the standby mode are referred to simply as "software components" unless an explicit description is specifically given.

As shown in FIG. 1, in this embodiment, it is assumed that the computing unit 3a is running the software component A in the active mode and is running the software component C in the standby mode; the computing unit 3b is running the software component B in the standby mode and is running the software component C in the active mode; the computing unit 3c is running the software A in the standby mode; and the central management device 1 is running the software component B in the active mode.

Software components that have the function of centrally managing the individual computing units 3 in the computing system 20 are defined as central management components. In this embodiment, a computing unit that is running the central management component in the active mode is defined as the central management device 1. The computing units 3 are running the central management components in the standby mode and switch them to the active mode when a fault occurs in the central management component running in the active mode.

The availability management middlewares 31 are interposed between the software components and the operating systems 32 and launch the software components as child processes, thus serving as parent processes of the software components (see FIG. 3). Specifically, in addition to the function of periodically querying the operating systems 32 about abnormality information for the software components, which is ascertained by the operating systems 32, the availability management middlewares 31 are provided with a function of launching the software components as child processes, thus serving as the parent processes of the software components.

Upon acquiring the abnormality information for the software components, the availability management middlewares 31 report the abnormality information for the software components (abnormality report) to other computing units 3. Specifically, in the case in which one computing unit is running a software component in the active mode, at least one of the other computing units is running a software component that is the same as that software component in the standby mode, and, in the case in which a fault occurs in at least one software component running in the active mode or the standby mode, the availability management middlewares 31 report the abnormality information to the other computing units that are running the same software components.

For example, the case of the computing unit 3*a* in FIG. 1 will be described as an example. As shown in FIG. 1, in the case in which the computing unit 3*a* is running the software component A in the active mode and the availability management middleware 31 of the computing unit 3*a* acquires the abnormality information for the software component A, it reports the abnormality information for the software component A to the computing unit 3*c* which is running the same software component A in the standby mode.

For example, when a fault occurs in a software component that is running in the active mode, the availability management middleware 31 that has acquired the abnormality information therefor switches, of the software components under its own management, a software component for which the abnormality information has been reported from the standby mode to the active mode (fault recovery). In this way, even if a fault occurs in the software component running in the active mode, it is possible to quickly recover from the fault through the switch from the standby mode to the active mode performed by the availability management middleware 31.

Figure 4:
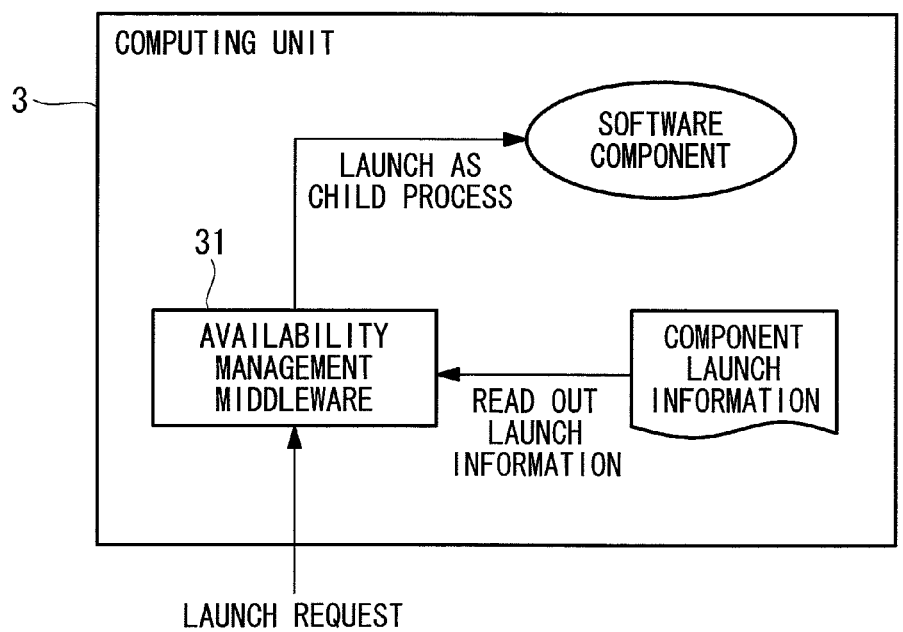
FIG. 4 is a diagram showing the relationship between an availability management middleware and a software component.

Furthermore, as shown in FIG. 4, in the case in which the availability management middleware 31 acquires a launch request for the software component A, it reads out information needed to launch the software component A from component launch information files which contain information for activating the individual software components, also sets preferences and parameters, and launches the software component A as its own child process. For example, after a software component that is in the standby mode at the time when a fault occurs in a software component is switched to the active mode, the availability management middleware 31 that has acquired the launch request sent from the central management device 1 newly creates a software component in the standby mode. By doing so, it is possible to restore the redundancy of the software components.

Figure 5:
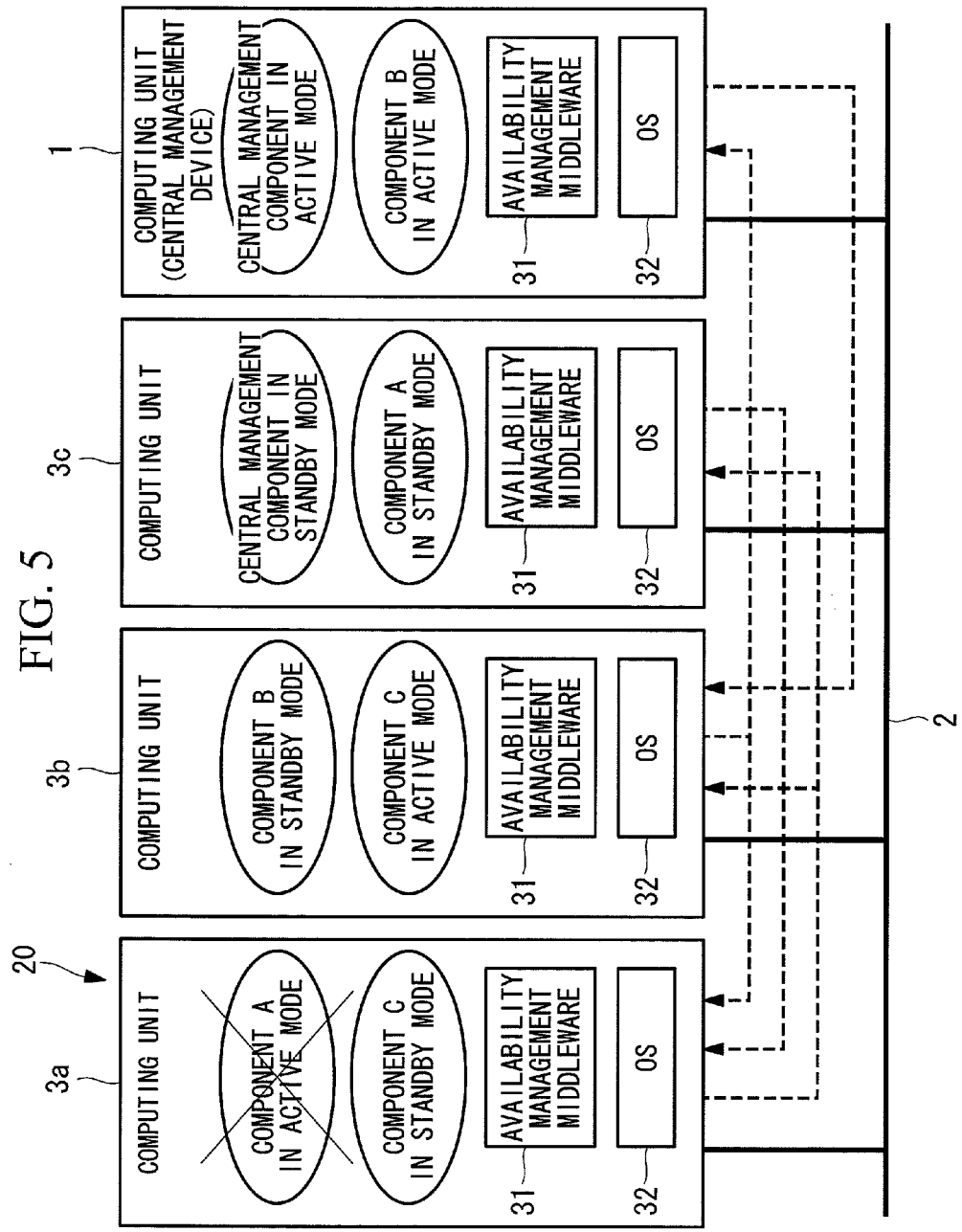
FIG. 5 is a diagram for explaining reporting of dead/alive information for the computing unit.

The availability management middlewares 31 monitor the statuses of the computing units (computing-unit dead/alive information) and report the computing unit statuses to the other computing units that are running software components that are the same as their own software components. The computing-unit dead/alive information is information including whether or not the computing units themselves are running correctly. For example, the case of the computing unit 3*b* in FIG. 5 will be described as an example. As shown in FIG. 5, the computing unit 3*b* is running the software component B in the standby mode and is running the software component C in the active mode. In such a case, the availability management middleware 31 of the computing unit 3*b* reports the computing-unit dead/alive information for the computing unit 3*b* to the central management device 1 that runs the software component B (in the active mode) and the computing unit 3*a* that runs the software component C (in the standby mode).

In this way, the availability management middlewares 31 report the abnormality information for the software components and the computing-unit dead/alive information to the availability management middlewares 31 of the other computing units in an individually separated form. By doing so, it is possible to reduce the load exerted on the information transmission medium 2 because the individual pieces of information are reported at desirable timing in minimum amounts of information.

The operating systems 32 monitor the status of the software components and report the abnormality information therefor to the availability management middlewares 31 in the case in which abnormalities are detected in the software components. Specifically, the operating systems 32 monitor the software components that are the child processes in the computing units 3 for abnormalities and, when an abnormality (for example, in the case in which the correct state is assumed to be one in which a software component is running, the dead/alive information indicating that it is detected not to be running (is down), etc.) is detected in the monitoring results, the operating systems 32 report, as the abnormality information, that there is an abnormality in the software component in question to the availability management middlewares 31 which are the parent processes. In this way, the operating systems 32 autonomously report to the availability management middlewares 31, which are the parent processes, only when abnormalities are detected in the software components (child processes).

The central management device 1 is at least one computing unit among the computing units and is provided with the central management component that instructs the availability management middleware 31 thereof to launch/stop the software components. In addition, when a fault occurs in a software component that is running in the active mode and after a software component that is running, in the standby mode, the software component in which the fault has occurred is switched to the active mode from the standby mode, the central management device 1 selects a computing unit in which the software component for which the fault has occurred will newly be run in the standby mode.

More preferably, the central management device 1 preferably selects a computing unit disposed in a segment that is physically or virtually distant from the computing unit running the software component in which the fault has occurred in the active mode as the computing unit in which the software component will newly be run in the standby mode.

Next, the operation of the computing system 20 according to this embodiment will be described.

The central management device 1 reports information concerning the types of software components to be individually run, the statuses (the active mode or the standby mode) of the software components, etc. to the availability management middlewares 31 of the individual computing units 3a, 3b, and 3c, as well as that of the central management device 1 itself, as the launch requests. For example, when the launch request for the software component A is acquired by the availability management middleware 31 of the computing unit 3a, the information needed to launch the software component A is read out from the component launch information files, preferences and parameters are also set, and the software component A is launched as a child process of the availability management middleware 31.

In addition, the same processing is applied, and the software components are individually launched in the individual computing units 3a, 3b, and 3c, as well as in the central management device 1, in accordance with the launch requests (for example, see FIG. 1). Because the processing in the individual computing units 3 is the same, the description herein will focus on the software component A.

When the operating system 32 of the computing unit 3a that is performing the dead/alive monitoring of the software component A running in the active mode detects an abnormality in the software component A, the operating system 32 reports the abnormality information to the availability management middleware 31. Once the availability management middleware 31 acquires the abnormality information, the availability management middleware 31 individually reports the abnormality information for the software component A to the central management device 1 and the computing unit 3c that is running the same software component A in the standby mode.

Upon acquiring the abnormality information for the software component A, the computing unit 3c switches the software component A running in the standby mode to the active mode. In addition, once the central management device 1 acquires the abnormality information for the software component A and detects that the software component A has been switched from the standby mode to the active mode, the computing units 3 in which the software components A will newly be run in the standby mode are selected. The central management device 1 issues the launch requests for running the software components A in the standby mode to the availability management middlewares 31 of the computing units 3 that have been selected as the computing units in which the software components A will newly be run in the standby mode.

As has been described above, with the computing units 3 and the computing system 20 according to this embodiment, once the availability management middlewares 31 launch the software components, which are the child processes thereof, by serving as the parent processes of the software components, the operating systems 32 monitor the child processes (software components), and, when there are abnormalities in the running statuses of the child processes (software components), the operating systems report the abnormality information to the availability management middlewares 31, which are the parent processes. In addition, the availability management middlewares 31 report this abnormality information to the other computing units 3.

By doing so, as compared with the case in which the middlewares periodically query the operating systems about the presence/absence of abnormalities in the software components, as has conventionally been done, it is possible to reduce the processing load on the availability management middlewares 31 required to monitor the software components. In addition, because the availability management middlewares 31, in the case in which the abnormality information is acquired, report it to the other computing units related to the software components indicated in the abnormality information, as compared with the case in which the information about the presence/absence of abnormalities is periodically exchanged with the other computing units 3, it is possible to reduce the load exerted on the information transmission medium 2.

In addition, because the dead/alive information for the computing units 3 is reported only to the computing units 3 having the same software components as the software components the computing units 3 possess, the amount of information is reduced for the dead/alive information for the computing units 3, which reduces the load exerted on the information transmission medium 2.

{Modification}

Figure 6:
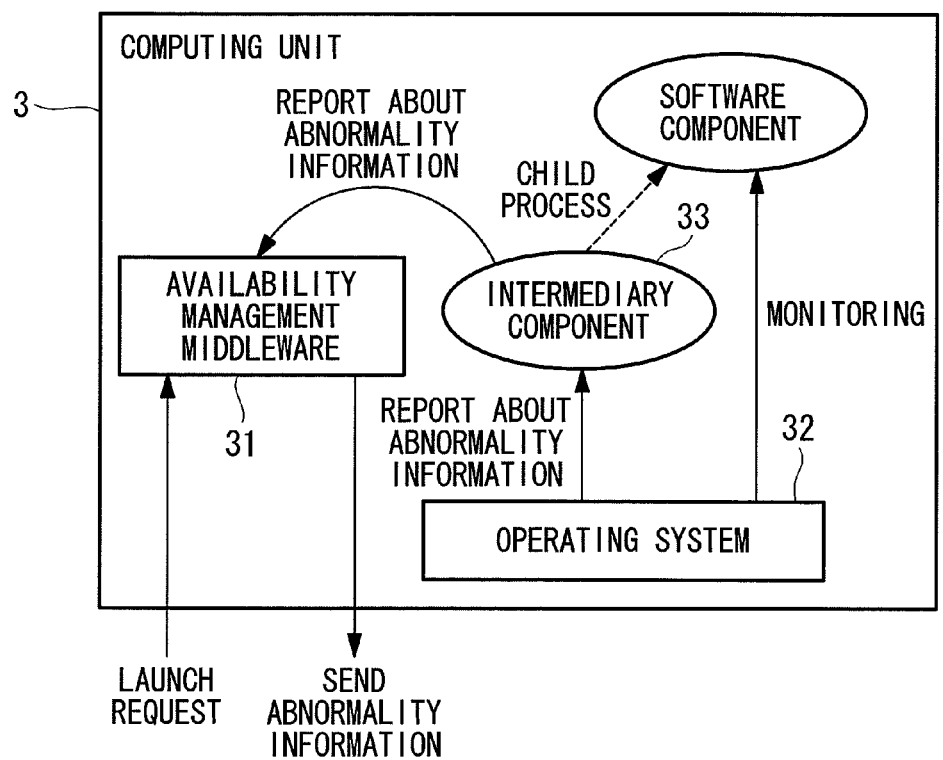
FIG. 6 is a diagram showing the relationship between the availability management middleware and the software component for a modification of the first embodiment of the present invention.

In addition, although this embodiment has been described assuming that the availability management middlewares 31 serve as the parent processes of the software components, which are the child processes, it is not limited thereto. For example, as shown in FIG. 6, instead of making the availability management middlewares 31 serve as the parent processes, intermediary components 33 that serve as the parent processes of the software components may be provided. In the case in which the intermediary components 33 are provided, the abnormality information for the software components, which are the child processes, ascertained by the operating systems 32 is output to the intermediary components 33, which are the parent processes, and, furthermore, the intermediary components 33 report the abnormality information to the availability management middlewares 31.

By providing the intermediary components 33 in this way, for example, even in the case in which the availability management middlewares 31 have complicated structures, etc. such that it is difficult to provide the availability management middlewares 31 with the function of serving as the parent processes of the software components, the parent processes of the software components can be simply created, and the abnormality information for the software components acquired by the operating systems can be autonomously reported to the availability management middlewares 31.

Although this embodiment has been described assuming that the launch requests for the software components are output from the central management components, it is not limited thereto. For example, they may be output from an arbitrary software component.

{Second Embodiment}

Next, a second embodiment of the present invention will be described by using FIG. 7.

A computing system of this embodiment differs from that of the first embodiment in that a plurality of software components to be run in the standby mode are provided. In the following, the computing system of this embodiment will be described mainly in term of the differences, and descriptions of commonalities with the first embodiment will be omitted.

The central management device monitors component arrangements and load situations for the entire computing system, calculates in advance the activation priority levels for switching the individual software components from the standby mode to the active mode, and sets them in the availability middlewares 31 in the individual computing units 3. In addition, the activation priority levels for the individual software components in the standby mode are recalculated by the central management device when the component arrangements and the load situations change in the computing system and are reset in the availability management middlewares 31 in the individual computing units 3.

Although this embodiment has been described assuming that the activation priority levels are set so that higher priority levels are set for the computing units with lower loads, it is not limited thereto. For example, they can be selected on the basis of a predefined priority ranking.

Upon acquiring the abnormality report for a software component, the availability management middleware 31 detects the activation priority level for the software component for which the abnormality report has been received and performs processing for the software component on the basis of the activation priority level. Specifically, in the case in which the activation priority level for the software component for which the abnormality report has been acquired indicates "top priority", the availability management middleware 31 switches that software component from the standby mode to the active mode. In contrast, in the case in which the activation priority level for the software component for which the abnormality report has been acquired does not indicate "top priority", the availability management middleware 31 increases the activation priority level of that software component in the standby mode by one level.

Next, the operation of the computing system according to this embodiment will be described.

Figure 7:
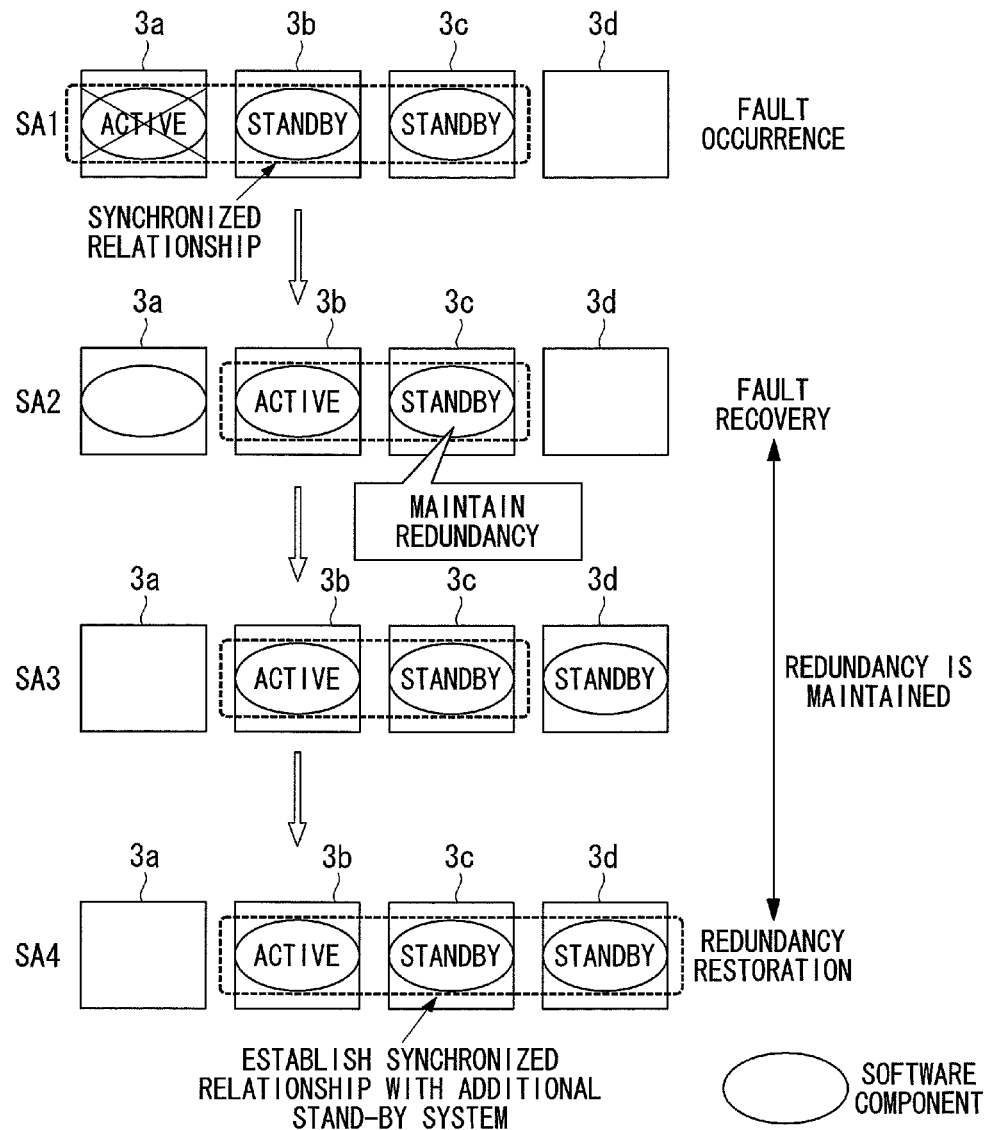
FIG. 7 is a diagram for explaining switching between an active mode and a standby mode for software components in a computing system according to a second embodiment of the present invention.

First, as shown in FIG. 7, the computing unit 3a runs a software component (for example, the software component A) in the active mode, and the computing units 3b and 3c individually run the software components (for example, the software components A) in the standby mode (Step SA1). A case in which the activation priority level for the software component A in the computing unit 3b is set to "top priority" and the activation priority level for the software component A in the computing unit 3c is not set to "top priority" will be described as an example.

Here, in the event of an abnormality occurring in the software component in the active mode in the computing unit 3a, the abnormality information for that software component is reported to the computing unit 3b and the computing unit 3c having the same software components, and the abnormality information is also reported to the central management device (not shown).

Upon acquiring the abnormality information, the availability management middleware 31 of the computing unit 3b switches the software component A from the standby mode to the active mode (Step SA2) on the basis of the activation priority level. In addition, the availability management middleware 31 of the computing unit 3c increases the activation priority level of the software component A by one priority level.

Once the central management device detects that the switching of the software component to the active mode has been completed in the computing unit 3b, subsequently, it selects a new computing unit that runs, in the standby mode, the software component for which the above-described switching to the active mode has been performed.

A computing unit 3d, which is a computing unit that is physically or virtually distant from the computing unit 3b (in a different segment from the computing unit 3b) in which the software component is run in the active mode, is selected as the computing unit that will newly run in the standby mode, excluding the computing unit 3a in which the abnormality has occurred.

The central management device outputs to the computing unit 3d a creation instruction for activating the software component in the standby mode. The computing unit 3d launches the software component in the standby mode (Step SA3). In addition, after the software component is newly launched in the standby mode in the computing unit 3d, software components in the active mode in the computing unit 3b and software components in the standby mode in the computing unit 3d are synchronized in terms of the information processed therein, and thus, redundancy is restored (Step SA4).

Although it is assumed in this embodiment that a computing unit that is physically or virtually distant is preferentially selected for newly running the software component in the standby mode, it is not limited thereto. For example, a computing unit with a low load may be preferentially selected, or the selection may be made on the basis of a predefined priority ranking.

{Reference Signs List}
1 central management device
2 information transmission medium
3a, 3b, 3c computing unit
20 computing system
31 availability management middleware
32 operating system

The invention claimed is:

1. A computing unit that is provided with a storage device and that is connected with another computing unit via an information transmission medium in a mutually communicable manner,
   wherein the storage device stores an operating system, middleware, a software component, and an intermediary component,
   wherein the intermediary component, which is interposed between the software component and the operating system and which serves as a parent process of the software component, instruct a computer to launch the software component as a child process and to output abnormality information for the software component to the middleware that manages availability of the software component,
   wherein the operating system instructs the computer to monitor a running status of the software component and to report the abnormality information to the intermediary component in the case in which an abnormality is detected in the software component, and
   the middleware instructs the computer to report the abnormality information acquired via the intermediary component for the software component to the other computing unit in which a software component that is the same as the software component running in the computing unit in which the abnormality is detected is run; to monitor a running status of the computing unit as dead or alive information for the computing unit; to report the dead or alive information to the other computing unit in which a software component that is the same as the software component running in the computing unit which is related to the dead or alive information is run; and to report the abnormality information for the software component and the dead or alive information for the computing unit by the computer to the other computing unit, individually.

2. A computing unit management method for a computing unit that is connected with another computing unit via an information transmission medium in a mutually communicable manner and comprises a storage device which stores an operating system, middleware, a software component, and an intermediary component, the method comprising:
   a stage of launching the software component as a child process by using a computer, which is instructed by the intermediary component that is interposed between the software component and the operating system and that serves as a parent process of the software component, and outputting abnormality information for the software component by the computer to the middleware that manages availability of the software component;

a stage of monitoring a running status of the software component by using the computer, which is instructed by the operating system, and reporting the abnormality information to the intermediary component by the computer, which is instructed by the operating system, in the case in which an abnormality is detected in the software component; and a stage of report in a the abnormality information for the software component, which is acquired via the intermediary component by using the computer to the other computing unit in which a software component that is the same as the software component running in the computing unit in which the abnormality is detected us run; monitoring a running status of the computing unit as dead or alive information for the computing unit; reporting the dead or alive information by the computer to the other computing unit in which the software component that is the same as the software component running in the computing unit which is related to the dead or alive information is run; and reporting the abnormality information for the software component and the dead or alive information for the software component by the computer to the other computing unit, individually.

3. A computing unit management program to be executed by a computer included in a comprising unit that is connected to another computing unit via an information transmission medium in a mutually communicable manner and that comprises a storage device which stores an operating system, middleware, a software component, and an intermediary component, the program causing the computer to execute:

processing in which the software component is launched as a child process by the intermediary component interposed between the software component and the operating system and serves as a parent process of the software component;

processing in which the intermediary component outputs abnormality information for the software component to the middleware which manages the availability of the software component;

processing in which the operating system monitors a running status of the software component and reports the abnormality information to the intermediary component in the case in which an abnormality is detected in the software component;

processing in which the middleware reports the abnormality information acquired via the intermediary component to the other computing unit in which a software component that is the same as the software component running in the computing unit in which the abnormality is detected is run; monitors a running status of the computing unit as dead or alive information for the computing unit; reports the dead or alive information to the other computing unit in which the software component that is the same as the software component running in the computing unit which is related to the dead or alive information is run; and reports the abnormality information for the software component and the dead or alive information for the computing unit, individually.

* * * * *